Feb. 12, 1924.
C. KIEL
TRACTOR HITCH
Filed Oct. 3, 1919
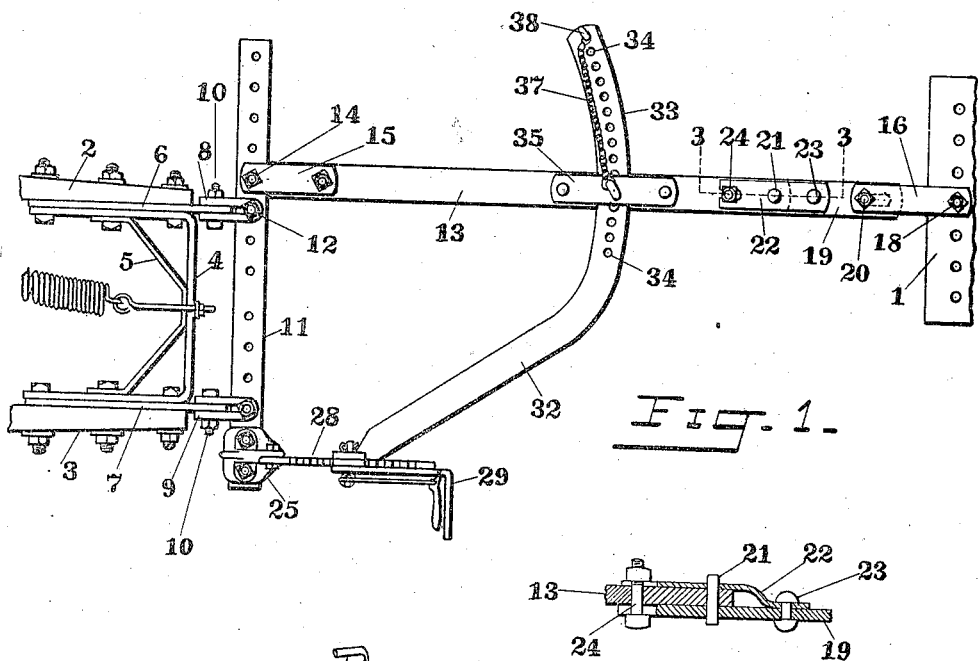
Fig. 1.
Fig. 3.
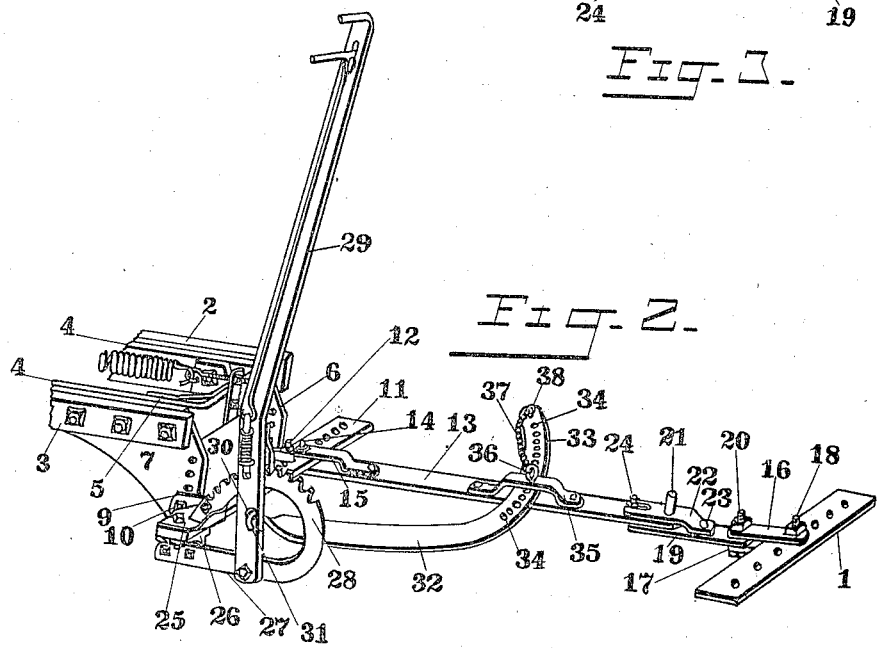
Fig. 2.
Witness:
E. Wilderson
Inventor:
Chris Kiel
by W.C. Jrdinston
Attorney Patented Feb. 12, 1924.

1,483,514

UNITED STATES PATENT OFFICE.

CHRIS KIEL, OF MOLINE, ILLINOIS, ASSIGNOR TO DEERE & COMPANY, OF MOLINE, ILLINOIS, A CORPORATION OF ILLINOIS.

TRACTOR HITCH.

Application filed October 3, 1919. Serial No. 328,239.

*To all whom it may concern:*

Be it known that I, CHRIS KIEL, a citizen of the United States, residing at Moline, in the county of Rock Island and State of Illinois, have invented certain new and useful Improvements in Tractor Hitches, of which the following is a specification, reference being had therein to the accompanying drawing.

My invention relates to tractor drawn agricultural machinery and the object of my invention is to provide a means readily operable from the tractor and by which a tractor drawn plow can be guided to take more or less land as may be desired.

Referring to the drawings in which similar numerals indicate identical parts—

Figure 1 is a plan view of my device mounted between the forward end of a plow and the rear of a tractor.

Figure 2 is a perspective view, and

Figure 3 is an enlarged detail section on the line 3—3 of Figure 1.

Sufficient of a rear transverse hitch beam 1 of a tractor, and the forward portion of a wheeled plow is shown to illustrate the application of my invention, the wheels being omitted. Portions of plow beams 2 and 3 are shown spaced apart and rigidly connected together by braces 4 and 5 which are bolted to the beams. Clevises 6 and 7 are mounted on the beams 2 and 3 respectively, and are secured between the braces 4 and 5 by the same bolts holding the brace 4 and beams 2 and 3 together. Draft links 8 and 9 are pivotally connected to the clevises 6 and 7, by suitable horizontal bolts 10, and to a transverse draft beam 11 by vertical bolts 12 extending through holes in the beam, a sufficient number of said holes being provided to permit lateral adjustment of the beam.

A draft bar 13 is pivotally secured to the under side of the beam 11, adjacent the landward link 12, by a bolt 14 which also secures one end of a strap 15 to the upper side of the beam 11; the strap 15 extends forwardly and is bolted to the beam 13. A link 16 above the hitch beam 1 and a link 17 below are pivotally secured to the hitch beam 1 by a bolt 18; a bar 19 has its forward end pivotally held between the rear ends of the links 16 and 17 by a bolt 20. The bar 19 extends rearwardly beneath the draft bar 13 and is secured thereto by a wooden break pin 21 which passes through the bar 19, the draft-bar 13 and a strap 22 which is secured forwardly to the bar 19 by a rivet 23; the bar 19 and the strap 22 are both slotted at their rear ends for engagement of a bolt 24 in order that the tractor and plow may separate when the break pin 21 is broken from any one of various causes.

A bracket 25 is on the upper side of the furrowward end of the beam 11 and a bracket 26 is on the under side, both brackets being rigidly bolted to the beam 11. A notched sector 28, vertically disposed, is bolted to the bracket 25 and has a horizontal arm 27 which is secured to the bracket 26. A lever 29 is pivotally mounted on the arm 27, its upper portion inclined forwardly to be within reach of the tractor operator. The lever 29 is provided with the usual type of latch to engage with any one of the notches in the sector 28.

In the lever 29, between its pivot and its engagement with the sector 28, is an aperture 30 for the reception of the hooked end 31 of a connecting bar 32 which extends diagonally forward toward the draft bar 13 for part of its length, the remainder of its length presenting a rearward curve 33 provided with a series of holes 34. The curve 33 extends over the draft bar 13 and under a strap 35, both ends of which are riveted or otherwise secured to the draft bar 13 on opposite sides of the curve 33. An eyebolt 36 is adapted to be passed through an aperture in the strap 35, any one of the holes 34 and an aperture in the draft bar 13, in order to provide for fixture of the curve 33 at various points of lateral adjustment, and to prevent loss of the eyebolt 36, I provide a chain 37 which is secured to the eyebolt 36 and to a similar eyebolt 38 in the free end of the curve 33.

In the drawings the parts are shown as in position when the tractor and plow are traveling straight ahead, but it is readily apparent that if the lever 29 is swung on its pivot toward the tractor the plow will be inclined away from the direct line and in a furrowward direction and in consequence will take less land in plowing; it is also apparent that if the lever 29 is swung rearwardly the effect will be to guide the plow landwardly to take more land. As indicated by the two plow beams 2 and 3 my device is shown connecting a two body wheeled plow with a tractor; to make it applicable to plows having a greater number of plow bodies the draft bar 13 will have to be moved laterally and bodily to the center of draft, which differs according to the number of plow bodies employed, and to provide for this lateral adjustment the draft beam 11, secured transversely to the plow, and the hitch beam 1, secured to the tractor, have a sufficient number of holes for securing the draft bar 13 at any desired point by means of the bolts 14 and 18. It is necessary, when it is desired to move the draft bar 13 laterally, that the eyebolt 36 be withdrawn so that the draft bar 13 will be free to move laterally without changing the position of the connecting bar 32, and after the draft bar 13 is properly placed, the eyebolt 36 is again inserted through the strap 35, the draft bar 13 and one of the holes 34 in the curve 33 of the bar 32, the parts cited will then be in a similar relative position as shown in the drawings.

Moving the draft bar bodily laterally in either direction from the central draft line of the tractor, in which the draft bar 13 is supposed to be in Figure 1, will offset the plow to right or left of the tractor according to the direction in which the draft bar 13 is moved bodily, I find, however, that by adjustment of the connecting bar 32 to the right the plow will be guided in that direction to further offset it from central draft line of the tractor, and a similar adjustment made to the left will result in a similar movement of the plow in that direction. It is also possible to offset the plow by removing the bolts 14 and 36 and swinging the rear end of the draft bar to one of the other holes in the draft beam 11, according to the direction in which it is desired the plow shall swing, and securing it there by the bolt 14, after which the bolt 36 is reinserted to hold the new adjustment which will angle the draft bar to the line of draft, and it is obvious that a similar result can be obtained by removing the bolts 18 and 36 and angling the draft bar 13 to the right or left and reinstating the bolts 18 and 36. In both of these operations extreme accuracy of the plow work is controlled by the lever 29 to which the connecting bar 32 is pivotally attached. It is also true that the draft bar 13 can be adjusted angularly to the line of draft to a greater or lesser degree by operation of the lever 29 and the connecting bar 32.

My device is efficient in regulating the plow, as described, not only on level ground, but on an inclined surface such as generally found in a rolling country, with either condition the plow can be retained in the direct line of travel of the tractor, or it can be adjusted to take more or less ground as explained.

What I claim is—

1. In a tractor hitch, the combination with a tractor and a trailing body, of a draft beam supported by the trailing body, a draft device pivotally connected to the tractor and to the draft beam and bodily adjustable laterally to vary the line of draft, a notched sector secured to the draft beam at one side of the draft device, a lever pivotally mounted on the sector and having means operative to engage the notches of the sector, and a connecting bar pivotally connected to the lever and having it forward end adjustably connected with the draft device to adjust said draft device to the line of draft irrespective of said bodily adjustment.

2. In a tractor hitch, the combination with a tractor and a trailing body, of a draft beam pivotally supported by the trailing body for vertical rocking movement, a draft device pivotally connected to the tractor and to the draft beam and bodily adjustable laterally to vary the line of draft, a notched sector secured to the draft beam at one side of the draft device, a lever pivotally mounted on the sector and having means operative to engage the notches of the sector, and a connecting bar pivotally connected to the lever and having its forward end adjustably connected with the draft device to adjust said draft device to the line of draft irrespective of said bodily adjustment.

3. In a tractor hitch, the combination with a tractor and a trailing body, of a draft beam pivotally supported by the trailing body for vertical rocking movement, a draft device pivotally connected to the tractor and to the draft beam and bodily adjustable laterally, said draft device being bodily adjustable both angularly and rectilinearly to vary the line of draft, a notched sector secured to the draft beam at one side of the draft device, a lever pivotally mounted on the sector and having means operative to engage the notches of the sector, and a connecting bar pivotally connected to the lever and having its forward end adjustably connected with the draft device to adjust said draft device to the line of draft irrespective of said bodily adjustment.

4. In a hitch, the combination with a tractor and a trailing body, of a draft beam pivotally supported by the trailing body for vertical rocking movement, a draft device pivotally connected to the tractor and to the draft beam and bodily adjustable laterally longitudinally of the draft beam to vary the line of draft, a notched sector secured to the draft beam at one side of the draft device, a lever pivotally mounted on the sector and having means operative to engage the notches of the sector, and a connecting bar pivotally connected to the lever and having its forward end curved and adjustably connected with the draft device to adjust said draft device to the line of draft irrespective of said bodily adjustment.

CHRIS KIEL.